United States Patent [19]

Schnitzler

[11] 4,068,853
[45] Jan. 17, 1978

[54] STUFFING BOX SEAL
[75] Inventor: Danny Louis Schnitzler, North Ridgeville, Ohio
[73] Assignee: Union Carbide Corporation, New York, N.Y.
[21] Appl. No.: 709,211
[22] Filed: July 27, 1976

Related U.S. Application Data
[63] Continuation of Ser. No. 618,064, Sept. 30, 1975, abandoned, which is a continuation of Ser. No. 354,318, April 25, 1973, abandoned.
[51] Int. Cl.² .............................................. F16J 15/16
[52] U.S. Cl. .................................... 277/102; 277/204; 277/DIG. 6
[58] Field of Search ................ 277/102, 26, 233, 210, 277/212, 204, 227, DIG. 6; 161/125

[56] References Cited
U.S. PATENT DOCUMENTS

| 2,819,919 | 1/1958 | Pearce et al. | 277/204 |
| 2,940,168 | 6/1960 | Monroe | 277/204 |
| 3,284,086 | 11/1966 | Primrose et al. | 277/102 |
| 3,404,061 | 10/1968 | Shane et al. | 161/125 |

OTHER PUBLICATIONS

Price List "Grafoil" Ribbon-Pack; Apr. 10, 1972; by Union Carbide Corp.
"Grafoil" Ribbon-Pack Technical Information Bulletin; No. 524-204cb; by Union Carbide Corp.

Primary Examiner—Richard E. Aegerter
Assistant Examiner—L. Footland
Attorney, Agent, or Firm—John S. Piscitello

[57] ABSTRACT

A highly efficient packing material is provided in the form of a flexible, corrugated expanded graphite ribbon or tape, which material can be used to pack the stuffing box assembly of any pump or valve, or like structure, regardless of the dimensions of the shaft and stuffing box of such pump or valve. The use of corrugated ribbon or tape of expanded graphite as a packing material eliminates the former requirement for pre-made rings which had to be sized to conform precisely to the dimensions of the stuffing box and shaft of such pump or valve, and vastly broadens the applicability and use of this highly efficient packing material to many field operations where such use was formerly impossible.

5 Claims, 8 Drawing Figures

STUFFING BOX SEAL

This application is a continuation of prior U.S. application: Ser. No. 618,064 Filing Date Sept. 30, 1975, now abandoned, which is a continuation of application; Ser. No. 354,318 Filing Date Apr. 25, 1973, now abandoned.

BACKGROUND OF THE INVENTION

1. Field of the Invention

This invention relates to a method of packing a stuffing box assembly so as to form more efficient seals, and to the seals formed thereby. More particularly, this invention relates to the formation of more efficient seals in the stuffing box assembly of pumps and valves, and like structures, through the use of a flexible, corrugated expanded graphite ribbon or tape.

2. Description of the Prior Art

Expanded graphite has long been employed as a packing material to form very efficient seals for the stuffing box assembly of pumps and valves. To date, such expanded graphite packing has taken the form of preshaped lamellar rings. While this form of packing provides a highly efficient seal for a wide variety of fluids under widely varying conditions, the use of such packing requires an exact interference fit between the preformed ring and the stuffing box and shaft of the pump or valve. Consequently, preformed packing of this type is impractical for field operations, and has found only limited application in those rare situations where the preformed rings conform exactly to the dimensions of the stuffing box and shaft.

SUMMARY OF THE INVENTION

The present invention provides a highly efficient packing material in the form of a flexible, corrugated expanded graphite ribbon or tape, which material can be used to pack the stuffing box assembly of any pump or valve, or like structure, regardless of the dimensions of the shaft and stuffing box of such pump or valve. The use of corrugated ribbon or tape of expanded graphite as a packing material eliminates the former requirement for premade rings which had to be sized to conform precisely to the dimensions of the stuffing box and shaft of such pump or valve, and vastly broadens the applicability and use of this highly efficient packing material to many field operations where such use was formerly impossible. This unique form of expanded graphite is highly flexible and can be easily installed in a stuffing box assembly by simply removing the gland from the stuffing box, wrapping the ribbon or tape around the portion of the shaft disposed in the stuffing box a number of times in such manner as to superimpose at least two layers of the ribbon or tape upon itself and fill the annular space between the shaft and the stuffing box, and then returning the gland to the stuffing box and tightening the gland so as to compress the ribbon or tape across its width and thereby effect the desired seal. Not only does this form of expanded graphite have the advantage of being extremely easy to install, but also, once installed, requires little or no subsequent adjustments. Moreover, most unexpectedly, expanded graphite ribbon and tape has been found to produce even more efficient seals than the preshaped rings formerly employed. Furthermore, by controlling the tightness with which the ribbon or tape is wrapped around the shaft and the degree to which the ribbon or tape is compressed by the gland, it is possible to control the highly directional thermal conductivity and thermal expansion properties of this material.

DESCRIPTIONS OF THE DRAWINGS

FIG. 1 is a view in perspective of a flexible, corrugated expanded graphite tape used to pack the stuffing box assembly of a pump or valve, or like structure, according to the present invention. The tape is shown partially unwound from a roll, with a small section of the tape being shown in magnified view to illustrate the corrugations.

FIG. 1a is a cross-sectional view of the stuffing box assembly of a conventional pump or valve. An expanded graphite tape, 10, is shown loosely wrapped about shaft, 11, set in stuffing box, 12. A gland, 13, is set loosely in place between stuffing box, 12, and shaft, 11.

FIG. 1b is a cross-sectional view of the same stuffing box assembly shown in FIG. 1a wherein gland 13 has been tightened so as to compress expanded graphite tape 10 across its width. The pressure exerted by gland 13 causes multiple folding of the loosely wrapped layers of graphite tape 10 along their lengths to form the tiered pattern shown in FIG. 1b.

FIG. 2a is a cross-sectional view of the same stuffing box assembly shown in FIG. 1a wherein expanded graphite tape 10 has been more tightly wrapped around shaft 11.

FIG. 2b is a cross-sectional view of the same stuffing box assembly shown in FIG. 2a wherein gland 13 has been tightened so as to compress expanded graphite tape 10 across its width. The pressure exerted by gland 13 causes multiple folding of the superimposed layers of graphite tape 10 along their lengths to form the continuous "W" pattern shown in FIG. 2b.

FIG. 3a is a cross-sectional view of the same stuffing box assembly shown in FIG. 1a wherein expanded graphite tape 10 has been very tightly wrapped around shaft 11.

FIG. 3b is a cross-sectional view of the same stuffing box assembly shown in FIG. 3a wherein gland 13 has been tightened so as to compress expanded graphite tape 10 across its width. The pressure exerted by gland 13 causes multiple folding of the superimposed layers of graphite tape 10 along their lengths to form the spaced "V" pattern shown in FIG. 3b.

DESCRIPTION OF THE PREFERRED EMBODIMENTS

The packing material employed in the present invention is capable of providing a seal which is effective for a wide variety of fluids over widely varying conditions of temperature and pressure, e.g., temperatures of from cryogenic to 3000° C., or higher, and pressures up to 20,000 psia., or higher. While it is possible to employ plain or non-corrugated expanded graphite ribbon or tape to effect the desired seal, the non-corrugated material is more fragile and difficult to use than the corrugated form of this material and, therefore, less preferred. Corrugated ribbon or tape of expanded graphite, on the other hand, in which the corrugations run across the width of the ribbon or tape, is more flexible and easier to wrap around a curved surface of small diameter, and is preferred for this reason.

Expanded graphite can be formed by expanding graphite particles of natural or synthetic origin by a factor of at least 80 times in the "c" crystallographic axis dimension, and then compressing the expanded particles to form a cohesive structure. The expansion of graphite particles can readily be achieved by attacking the bonding forces between layer planes in the internal structure of the graphite. The result of such an attack is that the spacing between the superimposed layers can be increased so as to effect a marked expansion in the direction perpendicular to the layers which is the "$c$" axis direction. The expanded particles can be formed under a slight pressure into a foam material since the particles have the ability to adhere without a binder due to the large expansion. Tapes, sheets, strips and the like are formed from the expanded particles by simply increasing the compressive pressure, the density of the formed graphite being related to the applied formation pressure. Densities of less than 5 pounds per cubic foot to about 137 pounds per cubic foot are readily obtained for this material. A full description of the method of making expanded graphite can be found in U.S. Pat. No. 3,404,061, issued on Oct. 1, 1968.

Corrugated expanded graphite can be made from non-corrugated expanded graphite by passing sheets, ribbons or tapes of the non-corrugated material through a pair of corrugating rolls. Both corrugated and non-corrugated forms of the material are commercially available under the trade name "Grafoil"* in a variety of widths. Ribbons and tapes having widths of from one-quarter inch to one inch, and thicknesses of from 0.005 inches to 0.020 inches, can be readily prepared.

* Registered trade mark of Union Carbide Corporation

Figure 1:
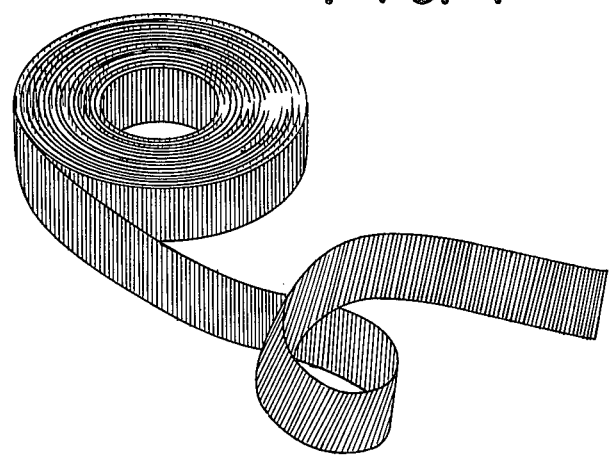
Figure 2A:
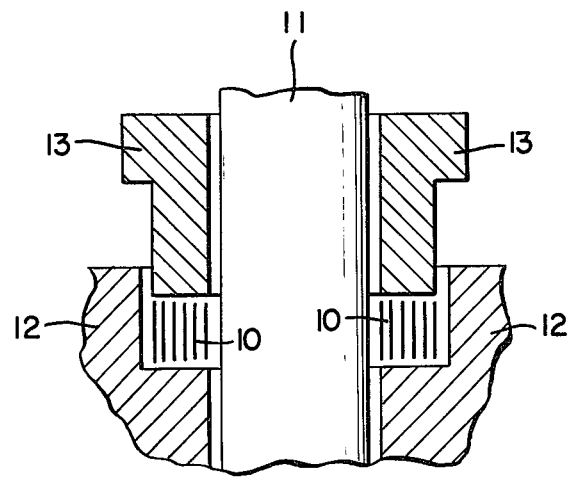
Figure 2B:
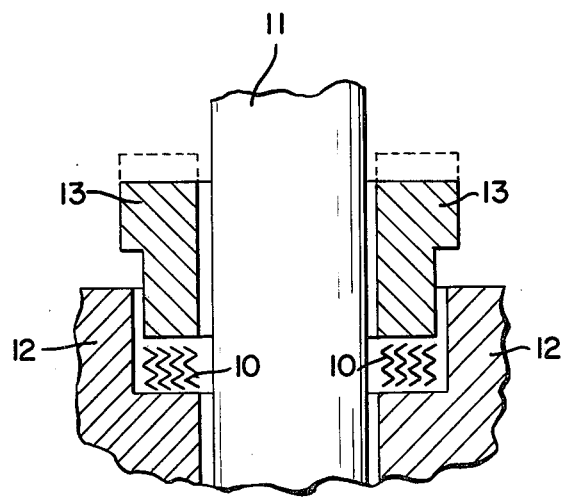
Figure 3A:
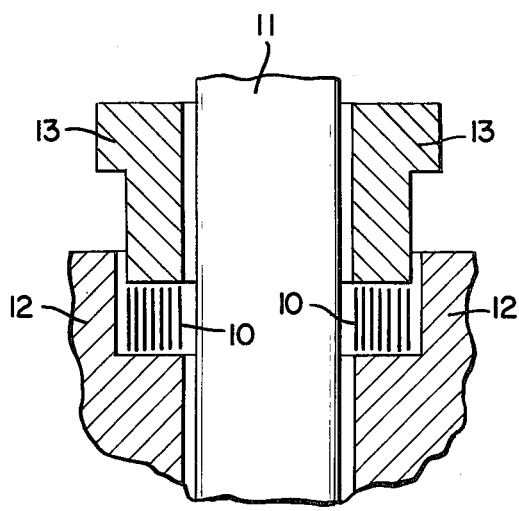
Figure 3B:
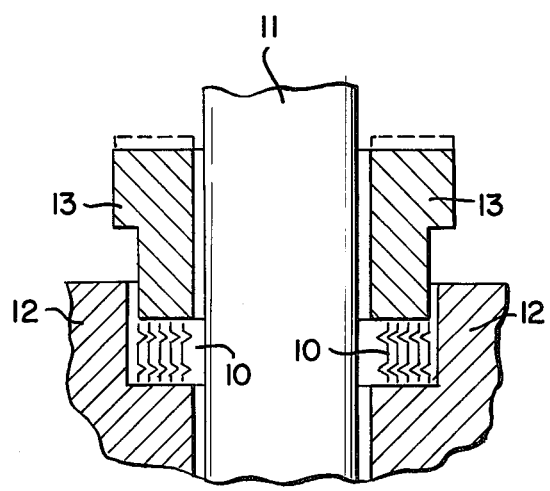

The ribbon or tape of expanded graphite is installed in a stuffing box assembly by removing the gland from the stuffing box, wrapping the ribbon or tape around the portion of the shaft disposed in the stuffing box a number of times in such manner as to superimpose at least two layers of the ribbon or tape upon itself and fill the annular space between the shaft and the stuffing box, and then returning the gland to the stuffing box and tightening the gland. Tightening of the gland can be effected by conventional means, e.g., by means of draw bolts, bonnet nuts, set screws, and the like. As the gland is tightened, it compresses the superimposed layers of ribbon or tape across their widths, causing multiple folding of these layers along their lengths in a zig-zag or accordian-like manner. The particular zig-zag pattern imparted to the layers is related to the tightness with which the ribbon or tape is wrapped about the shaft and the degree to which the ribbon or tape is compressed by the gland. FIGS. 1-3 illustrate the various patterns which may be produced depending upon the tightness with which the ribbon or tape is wrapped about the shaft. In any event, the zig-zag interlocking of the superimposed layers of the ribbon or tape which is produced when the ribbon or tape is compressed produces a seal which has been found to be even more efficient than that produced with preformed rings of expanded graphite.

The manner in which the ribbon or tape is installed, i.e., the tightness with which it is wrapped around the shaft, can be employed to control the highly directional thermal conductivity and thermal expansion properties of the material. A loose wrap, as illustrated in FIG. 1, will produce a packing with the highest thermal conductivity in the radial direction and the highest thermal expansion in the axial direction. A tight wrap, as illustrated in FIG. 3, will produce just the opposite, i.e., a packing with the highest thermal expansion in the radial direction and the highest thermal conductivity in the axial direction. An intermediate wrap, as in FIG. 2, will produce a packing having substantially equal thermal expansion and thermal conductivity in all directions. Thus, depending upon the method of installation, the packing material can be made to function either as a heat sink or an insulation.

What is claimed is:

1. In a stuffing box assembly comprising a stuffing box, a shaft disposed in said stuffing box, and a gland positioned between the shaft and the stuffing box, the improvement which comprises having at least two superimposed layers of a corrugated expanded graphite tape wrapped about the portion of said shaft disposed in the stuffing box, the corrugations of said expanded graphite tape running transverse to the length of the tape and the superimposed layers of said expanded graphite having multiple zig-zag interlocking folds along their lengths and forming an interference fit between the shaft and the stuffing box as a result of compression by the gland parallel to the direction of the corrugations.

2. A stuffing box assembly as in claim 1 wherein the superimposed layers of expanded graphite are folded in a tiered pattern.

3. A stuffing box assembly as in claim 1 wherein the superimposed layers of expanded graphite are folded in a pattern resembling a continuous "W".

4. A stuffing box assembly as in claim 1 wherein the superimposed layers of expanded graphite are folded in a pattern resembling a spaced "V".

5. A method of packing a stuffing box assembly comprising a stuffing box, a shaft disposed in said stuffing box, and a gland positioned between said shaft and said stuffing box, comprising (a) removing the gland from the stuffing box; (b) wrapping a corrugated expanded graphite tape having corrugations running transverse to the length of the tape around the portion of the shaft disposed in the stuffing box in such manner as to superimpose at least two layers of the tape upon itself and fill the annular space between the shaft and the stuffing box; and (c) returning the gland to the stuffing box and tightening the gland so as to compress the superimposed layers of the tape parallel to the direction of the corrugations and thereby effect an interference fit between the shaft and the stuffing box and provide a multiple folding of the superimposed layers along their lengths in an interlocking zig-zig manner.

* * * * *

UNITED STATES PATENT OFFICE
CERTIFICATE OF CORRECTION

Patent No. 4,068,853   Dated January 17, 1978

Inventor(s) Danny L. Schnitzler

It is certified that error appears in the above-identified patent and that said Letters Patent are hereby corrected as shown below:

Column 2, lines 8-11 should read:

-- according to the invention. The tape is shown partially unwound from a roll.

Figure 1C:
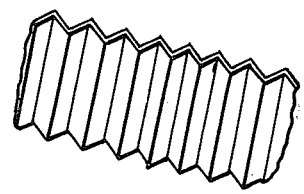
Figure 1A:
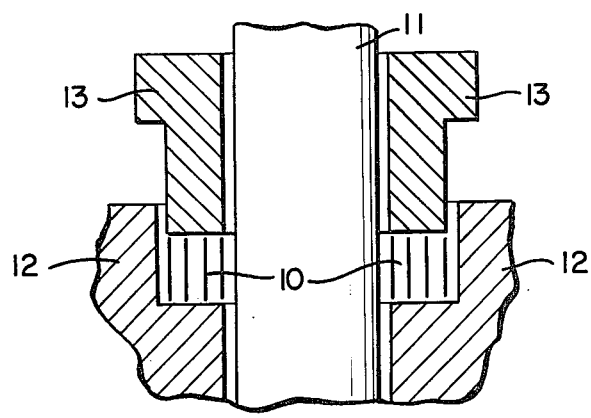
Figure 1B:
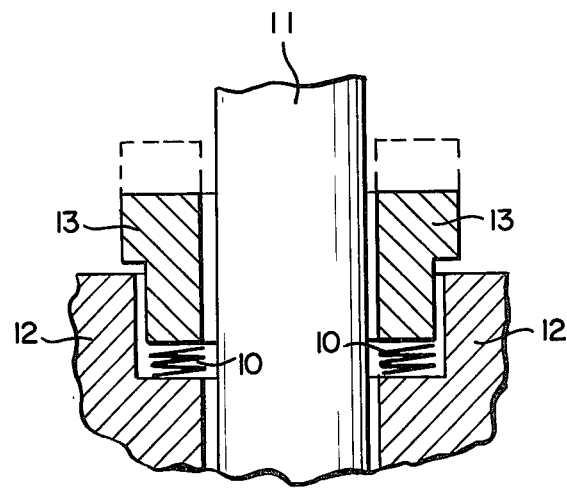

Figure 1c is a magnified view of a small section of the tape depicted in Figure 1 and illustrates the corrugations of the tape. --

Column 3, line 4, "superimposed" should read -- superposed --

Column 3, line 40, after "of" insert -- the --.

Signed and Sealed this

Sixteenth Day of May 1978

[SEAL]

Attest:

RUTH C. MASON
Attesting Officer

LUTRELLE F. PARKER
Acting Commissioner of Patents and Trademarks